July 30, 1968

E. L. BIRR 3,394,916

BALL VALVE AND METHOD OF MAKING SAME

Filed May 23, 1966

Inventor
Elmer L. Birr
By: Olson, Trexler, Wolters & Bushnell attys

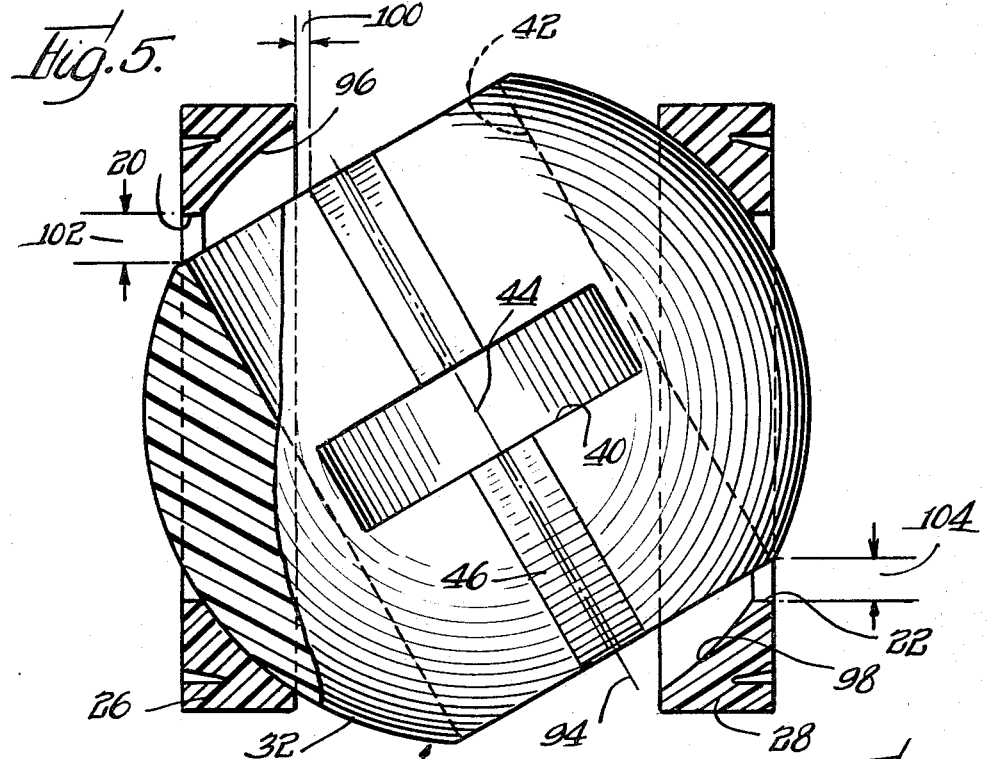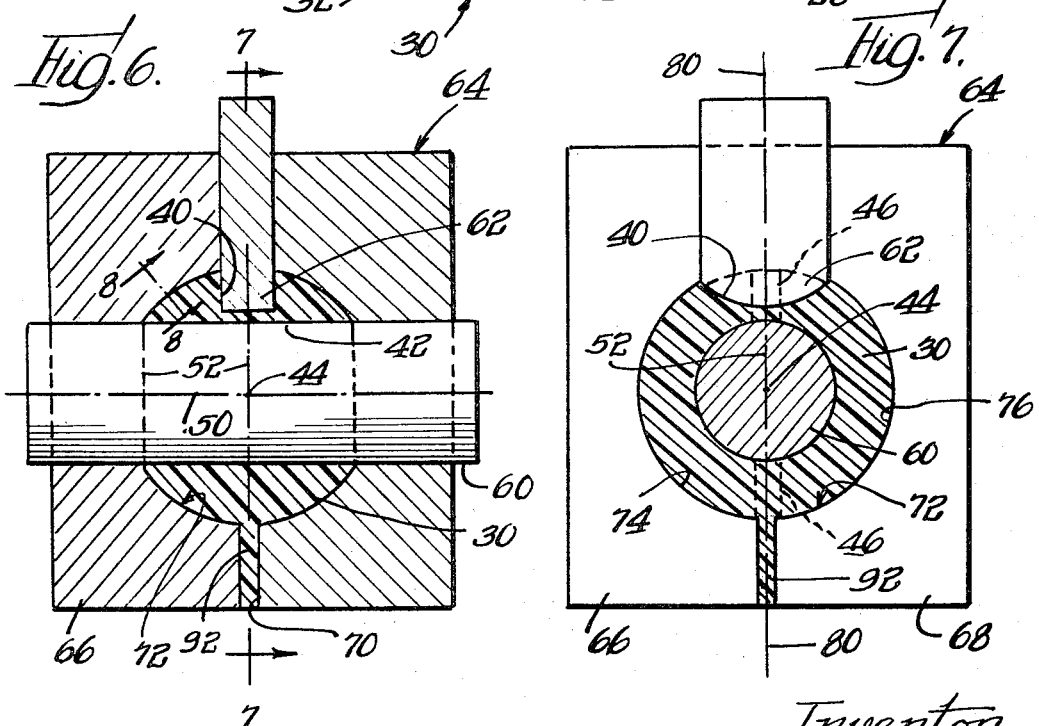

United States Patent Office 3,394,916
Patented July 30, 1968

3,394,916
BALL VALVE AND METHOD OF
MAKING SAME
Elmer L. Birr, West Dundee, Ill., assignor to Hills-
McCanna Company, Carpentersville, Ill., a corporation of Illinois
Filed May 23, 1966, Ser. No. 552,005
6 Claims. (Cl. 251—315)

The present invention relates to ball valves.

One object of the invention is to reduce the cost of manufacturing high quality ball valves, particularly ball valves having "floating" balls.

Another object of the invention is to produce high quality ball valves and, at the same time, eliminate inherently expensive manufacturing operations previously used in the production of high quality ball valves.

Another object is to provide a ball valve having a new and improved design which materially reduces the cost of manufacturing the ball valve while, at the same time, providing in the valve the dependability and serviceability obtained from prior ball valves of high quality that inherently have been markedly more expensive to manufacture.

A further object is to provide a ball valve having a novel and advantageously improved construction which permits production of the valve ball by molding the ball substantially ready for use thereby obviating expensive machining or finishing of the exterior ball surface without diminishing the effective performance capabilities of the valve as compared with prior valves incorporating balls having exterior surfaces machined or otherwise finished at considerable manufacturing costs.

A further object is to produce high quality ball valves by a new method which effectively eliminates the necessity for common and inherently expensive procedures previously used in the production of ball valves of similar quality.

Other objects and advantages will become apparent from the following description of the invention taken in conjunction with the accompanying drawings, in which:

FIG. 5 is a partly sectioned view of the ball on an enlarged scale showing the relationship of the ball to the coacting valve seats, also illustrated in section, as the ball turns through an inner intermediate position as the valve is opened or closed;

FIG. 6 illustrates the manner in which the valve ball is molded in accordance with the invention and shows the ball in section positioned within coacting mold structure illustrated largely in section;

FIG. 7 is a sectional view taken generally along the line 7—7 of FIG. 6;

Figure 8:
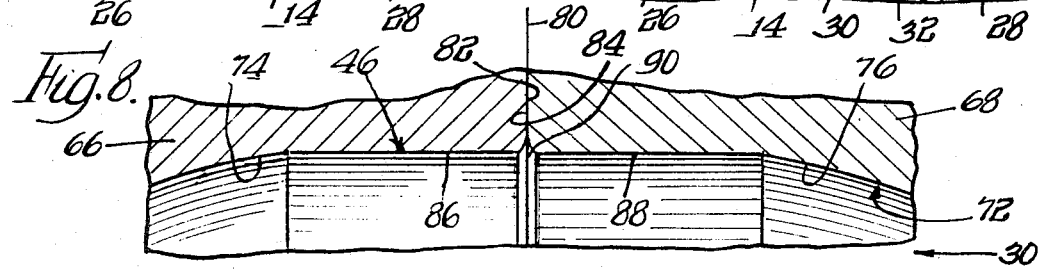
Figure 9:
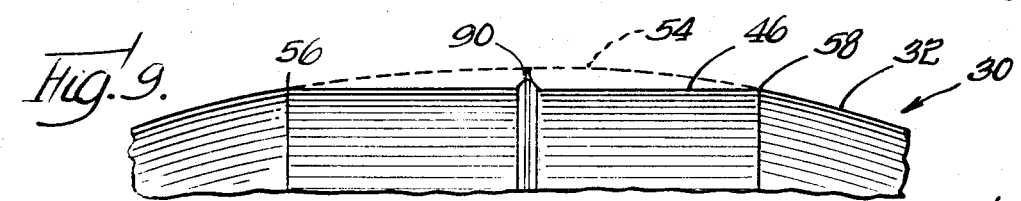

FIG. 8 is a fragmentary sectional view on a greatly enlarged scale taken along the line 8—8 of FIG. 6 and showing abutting portions of the coacting ball molds and an adjacent portion of the ball formed within the mold; and FIG. 9 is a greatly enlarged fragmentary sectional view similar to FIG. 8 but with the mold sections removed from the ball and illustrating optional pruning of the flash or rind molded on the ball.

Referring to the drawings in greater detail, the ball valve 10 forming the illustrated embodiment of the invention is constructed of plastics materials and comprises a valve body 12 formed in three sections, a hollow central section 14 internally threaded at opposite ends to receive two externally threaded end sections 16, 18 defining two flow passages 20, 22 opening into a central chamber 24 within the valve body. The inner ends of the end sections 16, 18 of the valve body support two annular valve seats 26, 28 in encircling relation to the inner ends of the respective flow passages 20, 22. The valve seats, 26, 28 are formed preferably from a yieldable polymeric material such, for example, as polytetrafluoroethylene, sold commercially under the trademark "Teflon."

The flow of fluid between the passages 20, 22 is controlled by a flow control ball 30 intervening between the seats 26, 28 and having an external surface 32 slidably engaging the two seats simultaneously.

Figure 1:
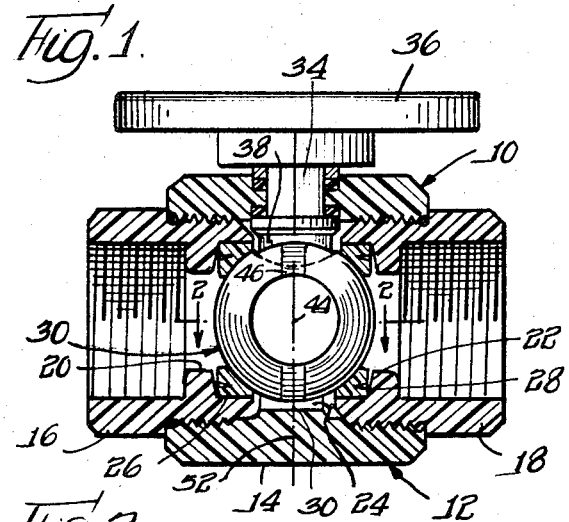
FIG. 1 is a longitudinal sectional view of a ball valve constructed in accordance with the invention.
Figure 2:
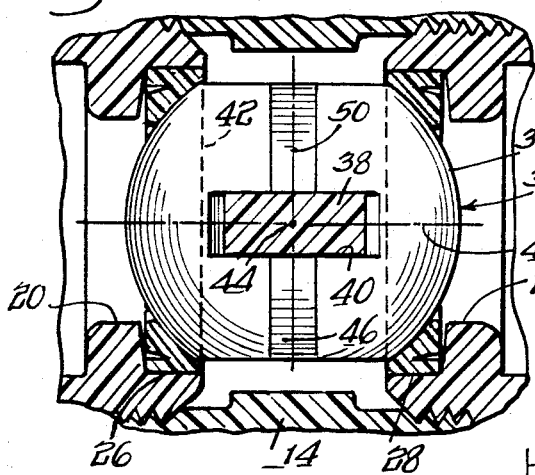
FIG. 2 is a fragmentary longitudinal sectional view on an enlarged scale taken generally along the line 2—2 of FIG. 1, but showing the ball unsectioned, as viewed from above, for clearness in illustration.
Figure 3:
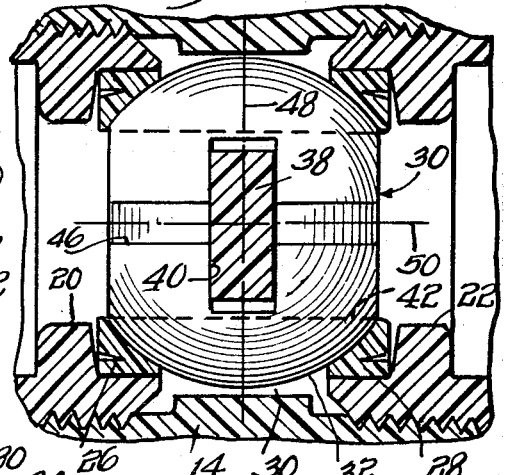
FIG. 3 is a fragmentary sectional view similar to FIG. 2 but showing the ball turned from closed valve to open valve position.

The ball 30 is rotated between a closed valve position, illustrated in FIGS. 1 and 2, and an open valve position, shown in FIG. 3, by means of a valve operating stem 34 sealably journaled in the central housing section 14, as shown in FIG. 1. The stem 34 may be turned by an external operating handle 36. The inner end of the control stem 34 is drivingly connected to the ball 30 by a flatted tang 38 on the inner end of the stem which fits slidably into a coacting slot or kerf 40 formed in the ball in such manner that when the ball is turned to its closed valve position, illustrated in FIG. 2, the ball is free to "float" or move under the differential force of fluid pressure on the ball toward the downstream valve seat, that is, the one of the valve seats 26, 28 which encircles the inner end of the one of the passages 20, 22 which is under the lower fluid pressure.

A flow passage or bore 42 formed in the ball 30 and extending centrally through the ball, as shown, has a diameter which is rather large in relation to the diameter of the ball, substantially exceeding in this instance one-half the diameter of the ball.

When the ball 30 is turned to its open valve position illustrated in FIG. 3, opposite ends of the ball passage or bore 42 are concentric with the seats 26, 28 and register with the respective flow passages 20, 22 to connect the latter for the flow of fluid through the valve.

When the ball 30 is turned to its closed valve position illustrated in FIGS. 1 and 2, opposite ends of the ball bore 42 are turned out of alignment with the flow passages 20, 22 so that the ball 30 coacts with the seats 26, 28 to block the flow of fluid through the valve.

It has been long recognized and appreciated that the character and precision of the external surface 32 of the ball 30 which slidably engages the valve seats 26, 28 are very important in achieving reliable operation of a ball valve over a long service life.

When the valve ball 30 is turned to its closed valve position illustrated in FIG. 2, the valve is sealed against the passage of fluid through the valve by the coaction of portions of the external ball surface 32 with the ball seats 26, 28. If the ball is misshapen or if the portions of the ball surface 32 which engage the seats 26, 28 when the valve is closed are marred by irregularities, there can be undesirable leakage through the valve even though the ball is turned to closed valve position.

Moreover, in a valve in which the ball 30 is free to move or float, the ball 30 is forced hard against the downstream seat, when the valve is closed, by the full force of differential fluid pressure on the ball. This force of differential fluid pressure urging the ball 30 against the downstream can be a definite aid in obtaining effective sealing of the valve against leakage through the valve. For this purpose, sufficient clearance is provided within the ball kerf or slot 40 around the operating tang 38 to allow displacement of the ball by differential fluid pressure toward and against the downstream seat.

It is evident that when the ball is being turned into and out of its closed valve position, the exterior surface 32 of the ball is forced hard against the downstream seat by the full force of differential fluid pressure on the ball. Irregularities in the external ball surface 32 can cause accelerated wear and erosion of the coacting seats as the ball is turned in relation to the seats.

To obtain effective sealing against leakage through such valves and to obtain the service life expected by high quality ball valves, it has been a practice to finish the external surfaces of the ball valves with precision using suitable machining operations. A common practice has been to form the balls of such valves initially by casting or molding procedures and then to finish the external surfaces of the ball by accurate machining of the external surfaces.

In accordance with this invention, ball valves of the character described are constructed and produced in a manner which obviates the need for expensive ball surface finishing operations previously used in the construction of high quality ball valves while, at the same time, producing ball valves having a serviceability and reliability which is effectively undiminished in relation to the capabilities of previously constructed high quality ball valves having ball surfaces precision finished at substantial cost by suitable machining operations. More particularly, the ball 30 of applicant's improved valve 10 is shaped and molded from a conventional plastics material in a manner such that the molded ball with the sprue and flash pruned, if desired, is assembled and used in the valve without machining or any other finishing operation being performed on the external seat engaging surface of the ball.

Except as the exterior surface 32 of the ball 30 of applicant's valve 10 is shaped in the manner to be described, the portion of the exterior surface 32 which comes into contact with the seats 26, 28 as the valve is used in service is curved with a common center 44 of curvature and with a spherical curvature of uniform radius.

Figure 4:
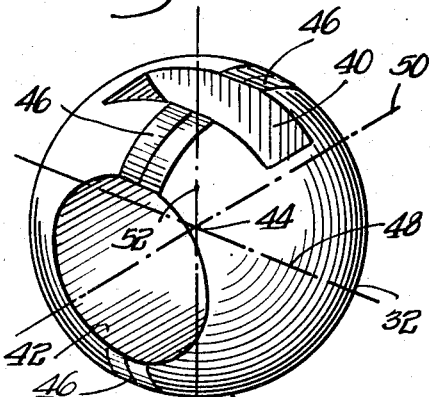
FIG. 4 is a perspective view of the flow control ball itself.

The spherical crvature of the external ball surface 32, thus described, is modified along an interrupted annular band or belt 46 oriented in encircling relation to the ball center 44 and in concentric relation to a reference axis 48, FIGS. 2 and 4, that is perpendicular to both the central axis 50 of the bore 42 and the axis 52, FIGS. 1 and 4, about which the ball 30 rotates between its open and closed valve positions.

Along the band or belt 46, the portions of the exterior ball surface 32, which are brought into contact with the valve seats 26, 28 in the course of normal usage of the valve, are depressed somewhat below the spherical curvature of the adjacent portions of the ball surface 32. As an aid in visualizing the shaping of the exterior ball surface 32 along the band or belt 46, the spherical curvature of the adjacent portions of the surface 32 is represented in FIG. 9 by an arcuate dotted line 54 arching across the band 46 as a continuation of the curvature of the adjacent portions of the ball surface 32.

In the preferred construction illustrated, the portions of the ball surface 32 within the band 46 have a chordal or substantially straight-line shape as viewed in transverse section, as shown in FIG. 9. Two criteria in relation to the shaping of the ball surface 32 within the band or belt 46 are particularly noteworthy. Within the band or belt 46, the ball surface 32 is depressed with reference to the spherical curvature 54 of adjacent portions of the ball surface. At the same time, the individual arcuate portions of the ball surface 32 within the band 46 are shaped, as viewed in transverse section, FIG. 9, so that the external surface 32 within the band 46, as viewed in this manner, is not concave even though depressed below the spherical curvature 54 of adjacent portions of the ball surface 32. Moreover, the arcuate portions of the ball surface 32 disposed within the band 46 merge smoothly along opposite edges with adjacent portions of the surface 32 having the spherical curvature 54. The smooth junctures of the exterior ball surface within the band 46 with adjacent portions of the surface 32 along opposite edges of the band 46 are identified in FIG. 9 by the numbers 56, 58.

By virtue of the relationships of the exterior ball surface 32 within the band 46 to adjacent portions of the ball surface 32, just described, together with the previously described orientation of the band 46 on the ball 30, the ball 30 can be molded substantially ready for use and will, upon assembly as molded into the valve 10, function properly in conjunction with the annular seats 26, 28 to preclude the passage of fluid through the valve when closed and to provide a long service life, the sealing effectiveness of the valve and the service life of the valve, including the seats, being undiminished by the deviation from a spherical shape of the portions of the exterior ball surface 32 within the band 46.

The manner in which the ball 30 of the improved valve 10 is molded, ready for assembly into the valve, is illustrated in FIGS. 6, 7, 8 and 9.

In the method by which the ball 30 is molded substantially ready for use, a male core element 60, shaped and dimensioned to form the ball bore 42, and a male core element 62, shaped and dimensioned to form the ball kerf or slot 40, are placed in a female mold 64 formed in two sections 66, 68 held in mutually confronting relation to each other, FIGS. 6, 7 and 8.

Plastic material in a fluent state for forming the ball 30 is injected through a gate 70, FIG. 6, in the mold 64 to enter an internal mold cavity 72 within which the fluent material solidifies to form the ball. The two male mold elements 60, 62 extend into cavity 72 as shown in FIGS. 6 and 7. Spherically concave internal surfaces 74, 76 have a common radius of curvature and a common center of curvature and function to form and shape the spherically curved exterior surface 32 of the ball 30 molded in the cavity 72.

The mold elements, including the female mold sections 66, 68, are used repeatedly in molding valve balls and are made separable from each other to release each molded ball 30 without damage. As indicated schematically in FIGS. 7 and 8, the two female mold sections 66, 68 are separable from each other adjacent the mold cavity 72 along a common plane of separation, represented in FIGS. 7 and 8 by the interrupted line 80, extending through the center 44 of the ball in parallel relation to both the axis 50 of the ball bore 42 and the axis 52, FIGS. 6 and 7, about which the ball 30 will rotate when assembled in the valve 10. It will be noted that the axis 52 of ball rotation extends centrally through the ball kerf 40.

Immediately adjacent the mold cavity 72 the female mold elements 66, 68 define respectively flat abutment surfaces 82, 84 which abut firmly against each other in an immediately adjacent relation to the mold cavity 72 in which the ball 30 is formed.

To provide the previously described shaping of the external ball surface 32 along the belt or band 46, the internal surfaces 74, 76 are shaped in adjacent relation to the inner edges of the abutting mold surfaces 82, 84 to form two relatively narrow cylindrical surfaces 86, 88 of equal diameter which merge smoothly with the spherically concave mold surfaces 74, 76 and which complement each other, as viewed in transverse section in FIG. 8, to form a straight chord having a transverse width equal to the desired width of the band 46 within which the ball surface 32 is depressed, as described.

Upon separation of the two female mold sections 66, 68, the two cylindrical surfaces 86, 88 slip off adjacent portions of the external ball surface band 46 to release the molded ball and the mold sections by virtue of the external ball surface within the band 46 not being concave in transverse section and being flush with adjacent portions of the ball surface 32.

The internal mold surfaces 74, 76 are formed with precision and the plastic material is injected into the mold cavity 72 under high pressure with the result that the exterior ball surface 32 is formed with great precision. Yet, on account of high fluid pressures within the mold cavity and the unavoidable deviation of the abutting mold surfaces 82, 84 from theoretically perfect shape, minor quantities of fluent plastic can flow outwardly along the plane of mold separation 80 into the interface between abutting surfaces 82, 84 to form immediately on the ball surface band 46 a thin protruding rind or flash 90 of small size which remains on the ball after it is removed from the mold cavity.

This thin rind or flash 90 is centered transversely within the band 46 wherein the ball surface 32 is depressed with the consequence that the rind or flash 90 is disposed wholly or at least largely radially within the spherical curvature 54 of adjacent portions of the ball surface 32.

As a consequence, the rind or flash 90, if desired, can be readily pruned back or peeled off at the time the small sprue 92, FIG. 6, is cut from the ball. Because of its small size in practice, the relative size of the rind or flash 90 is exaggerated in the drawings for the purpose of illustration. No particular care or precision need be exercised in pruning off the rind or flash 90, as desired, since no part of it protrudes beyond the spherical curvature 54 of the surface 32 of the completed ball. Hence, the cost of pruning off the protruding rind or flash 90 is inconsequential as is the cost of removing the sprue 92.

With the simple rind and sprue pruning operation performed, the ball 30 is assembled into the valve 10 in the usual manner.

The functional relationship of the band 46, along which the ball surface 32 is depressed and on which the base of the rind or flash 90 appears, to the coacting valve seats 26, 28 is illustrated in FIGS. 2, 3 and 5. The band 46 of depressed ball surface area may be helpfully visualized as extending symmetrically to opposite sides of a bisecting plane 94 extending through the center 44 of the ball, FIG. 5, in parallel relation to the ball bore axis 50 and in parallel relation to the axis 52 about which the ball rotates.

When the valve 10 is closed, as shown in FIG. 2, the ball bore 42 is turned out of alignment with the fluid passages 20, 22 and the full force of differential fluid pressure in the passages 20, 22 acts on the ball 30 to urge the ball in a downstream direction. When the ball 30 is floatingly disposed within the valve chamber 24, as in the present instance, play being provided between the rotating tang 38 and ball kerf 40 for this purpose, the ball physically moves under the differential force of fluid pressure in the direction of the downstream one of the seats 26, 28 sufficiently to transmit the full force of differential fluid pressure on the ball to the downstream seat. The resulting urging of the ball against the downstream seat by the force on the ball of differential fluid pressure (which can be quite high) can be a decided advantage in assuring an effective seal between the ball and the downstream seat. At the same time, the downstream seat provides a simple and effective support for the ball.

It should be observed with reference to FIG. 2 that when the valve is closed, with the full force of differential fluid pressure urging the ball against the downstream seat, the band 46 of depressed ball surface area, oriented on the ball 30 as described, is located midway between the seats 26, 28 so that none of the ball surface area 32 within the band 46 is in contact with either seat 26, 28. Moreover, the ball 30 can be turned through a substantial angle away from its normal closed valve position, illustrated in FIG. 2, toward the open valve position, shown in FIG. 3, before any portion of the depressed ball surface 32 in the band 46 is brought into contact with the seats 26, 28. The advantage of this will be referred to presently.

It will be observed with reference to FIG. 3 that when the ball 30 is turned to its normal open valve position, portions of the depressed ball surface 32 disposed in the band 46 and extending to opposite ends of the ball bore 42 are engaged with the seats 26, 28. However, at this time, the ball bore 42 is aligned with the fluid passages 20, 22 with the result that the fluid pressures on opposite sides of the ball are substantially equalized leaving no differential fluid pressure to urge the ball toward the downstream seat. Hence, the force holding the ball against each of the seats 26, 28 is limited to the residual force by which the ball is tightened by each seat, which residual force is only a fraction of the differential force of fluid pressure that may be applied to the ball when the valve is closed.

It will be evident with reference to FIG. 3, taken in conjunction with FIG. 5, that the ball 30 can be rotated through a substantial angle from its normal open valve position toward its normal closed valve position, FIG. 2, before the flow of fluid through the ball bore 42 between the passages 20, 22 is blocked by coaction of the ball 30 with the seats.

It may be noted at this point that the central openings through the annular seats 26, 28 are, in fact, inward continuations of the fluid passages 20, 22, which inward continuations for clearness in description are identified in FIG. 5 by the numbers 20, 22.

Having reference to FIG. 5, the yieldable polymeric seats 26, 28 define respectively annular ball opposing surfaces 96, 98 confronting the ball 30 for engagement with the exterior ball surface 32.

The band 46 of the ball surface 32 has a width that is restricted and limited in relation to the diameters of the ball 30 and ball bore 42 and in relation to the diameter and axial width of each seat surface 96, 98 so that the valve is partially open whenever portions of the ball surface 32 within the band 46 are rotated into engagement with the valve seats 26, 28.

FIG. 5 illustrates the positional relationship of the valve seats 26, 28 to the valve ball 30 when the valve ball is in an intermediate position between its normal open and normal closed positions. As shown, the ball surface 32 within the band 46 is axially spaced from the surface 96 of the seat 26, for example, by an axial spacing identified by the number 100. At the same time, the adjacent end of the ball bore 42 registers with the passage 20 through the seat 26, for example, to provide for the flow of fluid through the valve through a space 102, FIG. 5. A similar space 104 connects the opposite end of the ball bore 42 through the seat 28.

It will be appreciated in this connection that as long as the valve is partially open, the differential fluid pressure acting on the ball is reduced with a corresponding reduction in the force with which the ball is urged against the downstream seat.

It will be evident from FIG. 5 that during rotation of the ball in the clockwise direction to the normal closed valve position, FIG. 2, of the ball from the intermediate, partially open valve position of the ball, illustrated in FIG. 5, the depressed portion of the ball surface 32 within the band 46 is not in contact with the valve seats 26, 28. As a consequence, the only portions of the exterior ball surface 32 which are in contact with the valve seats 26, 28 when the ball is rotated while being urged against the downstream seat under the full load of differential fluid pressure on the ball, are those ball surface portions which have the truly spherical shape provided in the precision molding of the ball as described. The portions of the spherical surface 32 which are depressed in the band 46 do not engage either seat 26, 28 when the ball is subjected to the full load of differential fluid pressure.

On the other hand, it is evident that when the ball 30 is turned in the counterclockwise direction to its normal open valve position, illustrated in FIG. 3, from the intermediate, partially open valve position, shown in FIG. 5, the valve is partially open when the portions of the exterior surface 32 within the depressed band 46 initially make contact with the seats 26, 28 and becomes more open as contact between the seats and the ball surface within the band 46 increases. As a consequence, the force of engagement of the ball with the downstream seat is greatly reduced during movement of the ball surface portions within the band 46 in sliding engagement with the seats 26, 28. The result is an effective avoidance of scuffing or accelerated wear of the seat surfaces due to the exterior ball surface 32 being depressed within the band 46.

When the valve is open, FIG. 3, there is no need for the ball to form a fluid-tight seal with the seats 26, 28 and the fact that the ball surface 32 is depressed within the band portions 46 in engagement with the respective seats is of no consequence in relation to sealing of the valve.

As a consequence of these considerations, the dependability and serviceability of the improved valve is not diminished on account of the deviation from a true spherical curvature of the portions of the ball surface 32 within the band 46, as described.

It will be appreciated that the invention is not limited to the detailed construction of the particular valve 10 illustrated, but includes modifications within the spirit and scope of the invention as defined by the claims which follow.

What is claimed is:

1. A ball valve comprising, in combination, a valve body defining an internal valve chamber and two flow passages opening into said chamber on opposite sides thereof, two valve seats encircling the inner ends of said respective flow passages, a molded flow control valve ball intervening between said seats and having an exterior surface slidably engaging the seats, said ball defining a flow bore extending therethrough for passing fluid therethrough between said passages, operating means coacting with said ball to rotate the latter about an axis of rotation thereof between an open valve position in which opposite ends of said ball bore communicate with said respective passages and a closed valve position in which opposite ends of said bore are turned away from said passages so that communication between said passages is blocked by the ball, said ball being free to move under the force of fluid pressure thereon toward the one of said passages which contains the lower fluid pressure so that the differential force of fluid pressure on the ball urges the exterior surface of the ball against the seat encircling the inner end of the passage under the lower pressure; the entire area of said exterior surface of said ball, which comes in contact with said seats for all normal operating positions of the ball, being curved with a single center of curvature and a common and accurately formed spherical curvature, except for those portions of said exterior ball surface located within an annular band interrupted by opposite ends of the ball bore and being concentric with respect to an axis that extends through the center of the ball in generally perpendicular relation to both the axis of the ball bore and the axis of rotation of the ball; portions of said exterior ball surface located within said band being depressed somewhat in relation to the spherical curvature of adjacent portions of the exterior ball surface to provide between said spherical curvature and the exterior ball surface within said band radial clearance for the accommodation of flashing protuberances molded on the ball within the band, the portions of the exterior ball surface depressed within said band merging smoothly with adjacent portions of the ball surface on opposite sides of the band and being shaped to avoid a concave shaping of the surface within the band as viewed transversely in relation to the band, said valve seats defining annular seat surfaces confronting said ball for sealing engagement therewith, said band having a transverse width that is limited in relation to sizes of said ball and ball bore and in relation to the width and diameter of the seat surface of each valve seat so that the ball bore communicates at least partially with said flow passages at all times when the ball is positioned rotatably to engage with said seat surfaces the exterior ball surface within said band.

2. A ball valve comprising, in combination, a valve body defining an internal valve chamber and two flow passages opening into said chamber, a valve seat encircling the inner end of one of said flow passages, a molded flow control valve ball disposed in said chamber and having an exterior surface slidably engaging said seat, said ball defining a flow bore extending therethrough, operating means coacting with said ball to rotate the latter about an axis of rotation thereof between an open valve position in which said ball bore communicates with said passages to pass fluid therebetween and a closed valve position in which said bore is turned away from said one flow passage so that communication between said passages is blocked by the ball, the area of said exterior surface of said ball which comes in contact with said seat for all normal operating positions of the ball being curved with a spherical curvature except for those portions of said exterior ball surface located within an annular band interrupted by the ball bore and being bisected by a medial plane extending lengthwise in relation to the band and passing substantially through the center of the ball in generally parallel relation to the axis of rotation of the ball and in generally parallel relation to the end portion of the ball bore that is aligned with said one flow passage when the ball is in its open valve position, and portions of said exterior ball surface located within said band being depressed somewhat in relation to the spherical curvature of adjacent portions of the exterior surface.

3. A ball valve comprising, in combination, a valve body defining an internal valve chamber and two flow passages opening into said chamber, a valve seat encircling the inner end of one of said flow passages, a flow control valve ball molded in one piece from a plastics material and disposed rotatably in said chamber, said ball having an exterior surface slidably engaging said seat, said ball defining a flow bore extending therethrough, operating means coacting with said ball to rotate the latter about an axis of rotation thereof between an open valve position in which said ball bore communicates with said passages to pass fluid therebetween and a closed valve position in which said bore is turned away from said one flow passage so that communication between said passages is blocked by the ball, the area of said exterior surface of said ball which comes in contact with said seat for all normal operating positions of the ball being curved with a spherical curvature except for those portions of said exterior ball surface located within an annular band interrupted by the ball bore and being bisected by a medial plane extending lengthwise in relation to the band and passing substantially through the center of the ball in generally parallel relation to the axis of rotation of the ball and in generally parallel relation to the end portion of the ball bore that is aligned with said one flow passage when the ball is in its open valve position, portions of said exterior ball surface located within said band being depressed somewhat in relation to the spherical curvature of adjacent portions of the exterior surface to provide between said spherical curvature and the exterior ball surface within said band radial clearance for the accommodation of flashing protuberances molded on the ball, and said depressed portions of said exterior surface within said band merging smoothly with adjacent portions of the exterior surface on opposite sides of the band and being formed to avoid a concave shaping of the depressed surface portions as viewed transversely with respect to said band.

4. A ball valve comprising, in combination, a valve body defining an internal valve chamber and two flow passages opening into said chamber on opposite sides thereof, two valve seats encircling the inner ends of said respective flow passages, a molded flow control valve ball intervening between said seats and having an exterior surface slidably engaging the seats, said ball defining a flow bore extending therethrough for passing fluid therethrough between said passages, operating means coacting with said ball to rotate the latter about an axis of rotation thereof between an open valve position in which opposite ends of said ball bore communicate with said respective passages and a closed valve position in which opposite ends of said bore are turned away from said passages so that communication between said passages is blocked by the ball, said ball being free to move under the force of fluid pressure thereon toward the one of said passages which contains the lower fluid pressure so that the differential force of fluid pressure on the ball urges the exterior surface of the ball against the seat encircling the inner end of the passage under the lower pressure; the entire area of said exterior surface of said ball, which comes in contact with said seats for all normal operating positions of the ball, being curved with a single center of curvature and a common and accurately formed spherical curvature, except for those portions of said exterior ball surface located within a narrow annular band interrupted by opposite ends of the ball bore and being bisected by a medial plane extending lengthwise in relation to the band and passing substantially through the center of the ball in generally parallel relation to the ball bore and to the axis of rotation of the ball, portions of said exterior ball surface located within said band being depressed somewhat in relation to the spherical curvature of adjacent portions of the exterior ball surface and said band being dimensioned transversely in relation to said valve seats so that the ball bore communicates at least partially with said flow passages at all times when the ball is positioned rotatably to engage with said seats the exterior ball surface within said band.

5. The method of making a ball valve comprising, fabricating a ball valve body in a plurality of parts, fabricating valve seats; molding in one piece from a plastics materials a valve ball defining a flow bore therein and having a seat engaging external surface that is spherical in shape except for portions of the external surface that are depressed in relation to the spherical curvature of adjacent portions of the external surface and located within a narrow band interrupted by the flow bore and being bisected throughout its length by a medial plane extending through the center of the ball in parallel relation to the flow bore and the axis of ball rotation, flash protuberances molded on the ball as an incident to molding of the ball being confined to the band; and assembling the ball as molded, except for possible pruning of sprue and flash protuberances from the ball, with the valve body parts and valve seats to form an assembled ball valve.

6. The method of making a ball valve comprising, fabricating a ball valve body in a plurality of parts, fabricating valve seats; molding a rotatable valve ball having a bore therein by injecting fluent plastics material into a mold cavity encased by two mold sections mutually abutting in an interface plane extending substantially through the ball center in generally parallel relation to both the bore axis and the axis of ball rotation, which mold sections have spherically curved ball shaping surfaces merging at opposite ends of the ball bore with narrow surfaces of generally cylindrical shape extending to said interface plane; assembling the ball, without machining or other modification of the spherically curved exterior surface of the ball, with the valve body parts and valve seats to form an assembled ball valve.

References Cited
UNITED STATES PATENTS 3,271,845, 9/1966 Breher _____ 29—157.1

M. CARY NELSON, *Primary Examiner.*

J. R. DWELLE, *Assistant Examiner.*